(12) United States Patent
Choi et al.

(10) Patent No.: US 12,412,724 B2
(45) Date of Patent: Sep. 9, 2025

(54) FIELD EMISSION ASSEMBLY AND ELECTROMAGNETIC WAVE GENERATOR INCLUDING THE SAME

(71) Applicant: AweXome Ray, Inc., Anyang-si (KR)

(72) Inventors: Hong Soo Choi, Seoul (KR); Young Bae Kim, Anyang-si (KR); Hyeongu Cho, Yongin-si (KR); Namkyu Lee, Hwaseong-si (KR); Keunsoo Jeong, Seoul (KR); Se Hoon Gihm, Seongnam-si (KR); Sora Lee, Anyang-si (KR)

(73) Assignee: AweXome Ray, Inc., Anyang-si (KR)

( * ) Notice: Subject to any disclaimer, the term of this patent is extended or adjusted under 35 U.S.C. 154(b) by 405 days.

(21) Appl. No.: 18/070,062

(22) Filed: Nov. 28, 2022

(65) Prior Publication Data
US 2024/0136138 A1     Apr. 25, 2024
US 2024/0234071 A9     Jul. 11, 2024

(30) Foreign Application Priority Data

Oct. 21, 2022   (KR) .......................... 10-2022-0136579

(51) Int. Cl.
*C01B 32/16*    (2017.01)
*H01J 9/02*    (2006.01)

(52) U.S. Cl.
CPC .............. *H01J 9/025* (2013.01); *C01B 32/16* (2017.08); *C01B 2202/06* (2013.01); *H01J 2201/30469* (2013.01)

(58) Field of Classification Search
None
See application file for complete search history.

(56) References Cited

U.S. PATENT DOCUMENTS

| | | |
|---|---|---|
| 2003/0197120 A1 | 10/2003 | Miyamoto |
| 2004/0012327 A1 | 1/2004 | Shiratori et al. |
| 2004/0053780 A1 | 3/2004 | Jiang et al. |
| 2004/0104660 A1 | 6/2004 | Okamoto et al. |
| 2006/0091782 A1 | 5/2006 | Liu et al. |
| 2007/0145878 A1 | 6/2007 | Liu et al. |
| 2008/0170982 A1 | 7/2008 | Zhang et al. |
| 2014/0185777 A1 | 7/2014 | Liu et al. |
| 2018/0190466 A1 | 7/2018 | Park et al. |
| 2019/0002283 A1* | 1/2019 | Zhang .................... C04B 35/80 |
| 2020/0243295 A1 | 7/2020 | Gihm et al. |

(Continued)

FOREIGN PATENT DOCUMENTS

| | | |
|---|---|---|
| JP | 2002146634 A | 5/2002 |
| JP | 2003315240 A | 11/2003 |
| JP | 2004-107196 A | 4/2004 |

(Continued)

*Primary Examiner* — Idowu O Osifade
(74) *Attorney, Agent, or Firm* — Seed Intellectual Property Law Group LLP

(57) ABSTRACT

A field emission assembly and an electromagnetic wave generator are provided, the field emission assembly includes a linear emitter which includes carbon nanotube (CNT) fibers and emits electrons and a holder configured to fix the emitter, both ends of the emitter are fixed to the holder, and the emitter includes at least one of a curved portion so as to form a peak in an electron emission direction and a bent portion so as to form a peak in the electron emission direction.

20 Claims, 27 Drawing Sheets

(56) References Cited

U.S. PATENT DOCUMENTS

2021/0027969 A1    1/2021  Choi et al.

FOREIGN PATENT DOCUMENTS

| | | |
|---|---|---|
| JP | 2004-149996 A | 5/2004 |
| JP | 2005166565 A | 6/2005 |
| JP | 2006008425 A | 1/2006 |
| JP | 2006-107932 A | 4/2006 |
| JP | 2006196364 A | 7/2006 |
| JP | 2006294546 A | 10/2006 |
| JP | 2008-523254 A | 7/2008 |
| JP | 2011138795 A | 7/2011 |
| KR | 20030029626 A | 4/2003 |
| KR | 20120060613 A | 6/2012 |
| KR | 10-1384100 B1 | 4/2014 |
| KR | 10-1387700 B1 | 4/2014 |
| TW | 200800798 A | 1/2008 |
| TW | 202029256 A | 8/2020 |
| TW | 202105434 A | 2/2021 |
| WO | WO 2007015710 A2 | 2/2007 |
| WO | WO 2012074319 A1 | 6/2012 |

\* cited by examiner

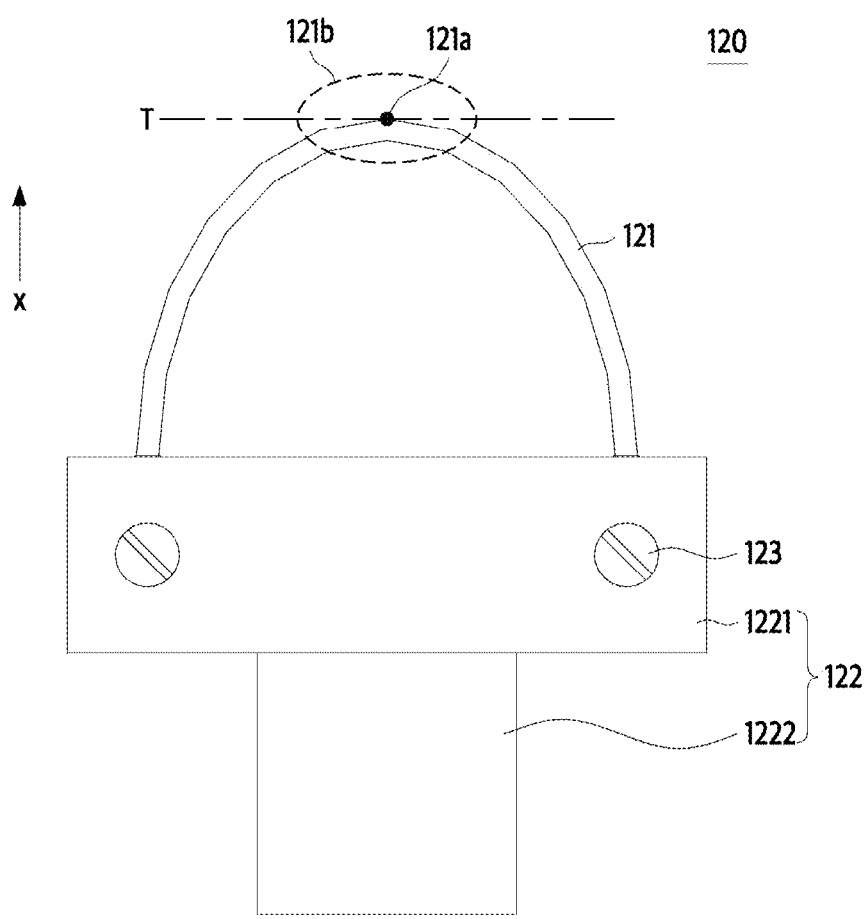

Twisted Yarn

Braided Yarn

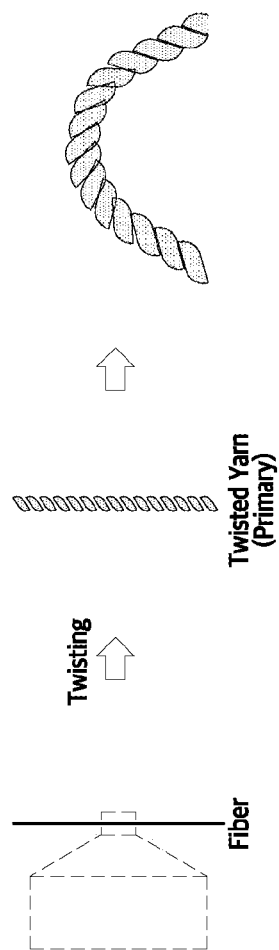

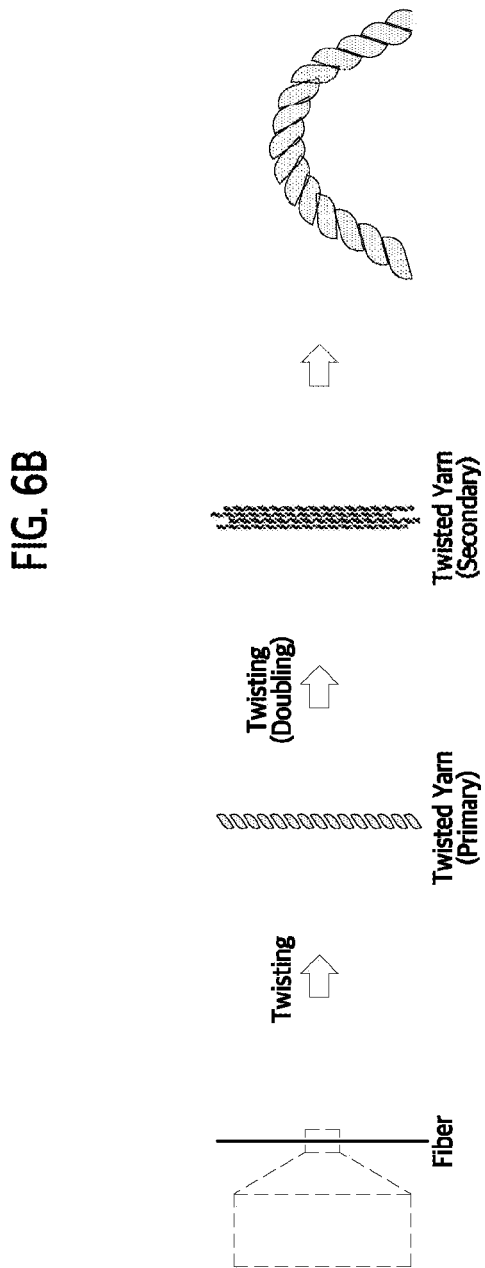

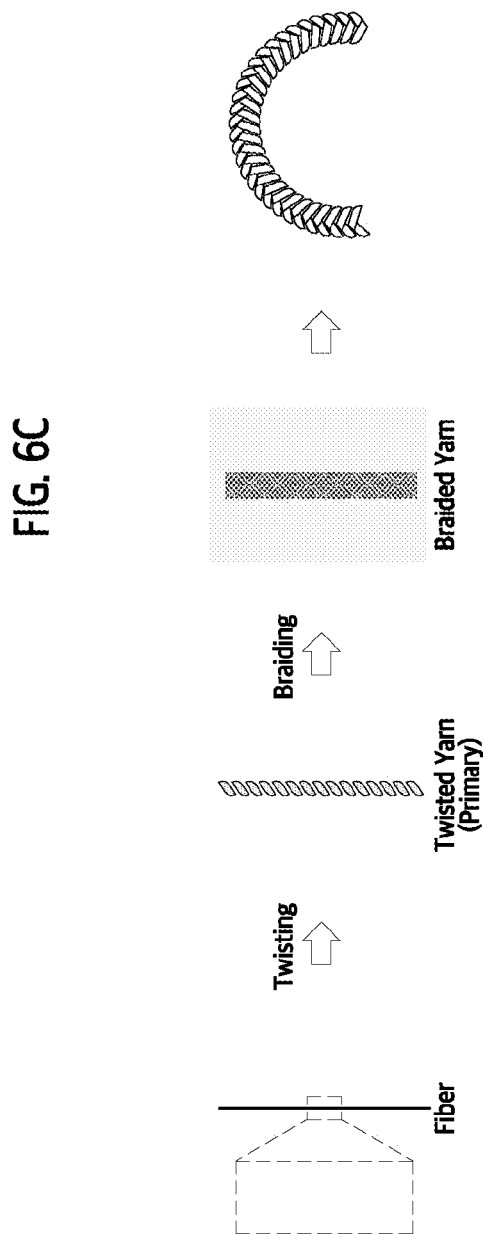

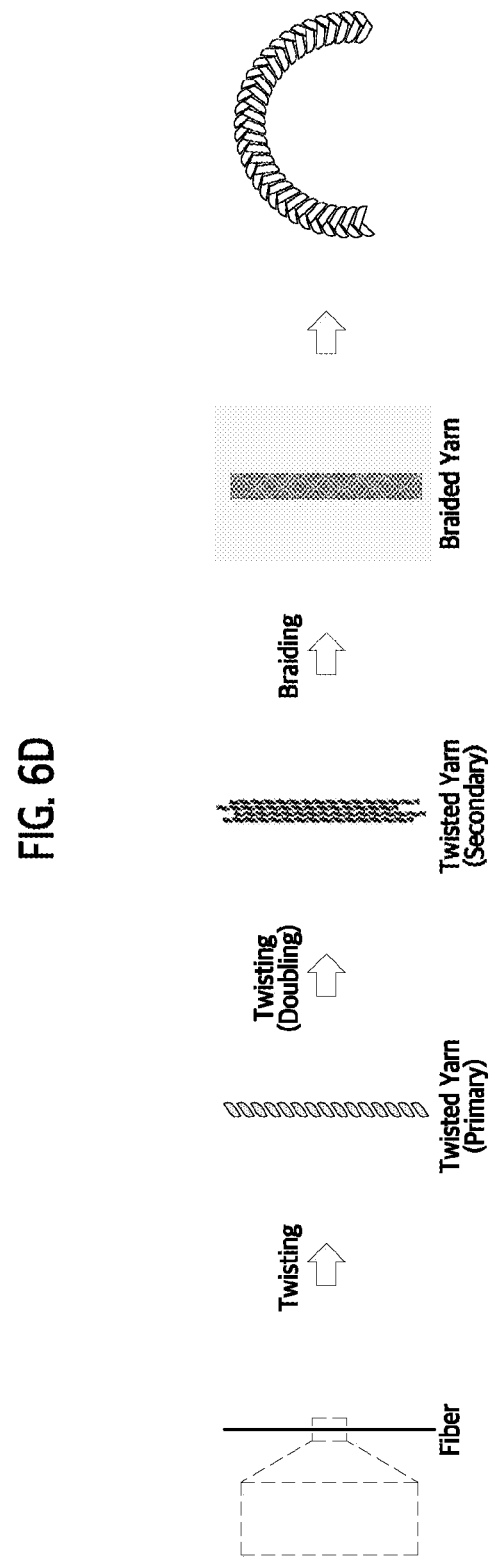

Non Twisted Yarn (64 Fiber)

75 Twisted Yarn (64 Fiber)

150 Twisted Yarn (64 Fiber)

Braided Yarn (64 Fiber)

FIELD EMISSION ASSEMBLY AND ELECTROMAGNETIC WAVE GENERATOR INCLUDING THE SAME

CROSS-REFERENCE TO RELATED APPLICATION(S)

This application claims the benefit of Korean Patent Application No. 10-2022-0136579, filed on Oct. 21, 2022, in the Korean Intellectual Property Office, the disclosure of which is incorporated herein by reference.

BACKGROUND

Technical Field

The present disclosure relates to a field emission assembly and an electromagnetic wave generator including the same, and more particularly, to a field emission assembly capable of uniformizing a field emission characteristic through a structure of an emitter and an electromagnetic wave generator including the same.

Description of the Related Art

Recently, with the development of a carbon nanotube (CNT)-related technology, a technology in which a cathode of the existing X-ray tube which emits hot electrons using the existing filament is replaced with a cold cathode using CNTs, which is capable of emitting electrons due to an electric field, is being developed.

Generally, a carbon nanotube-system X-ray tube includes a cathode including CNTs, a gate for inducing electron emission, a focusing part for improving electron focusing performance, and an anode for generating electromagnetic waves (specifically, X-rays) due to collision of the emitted electrons.

In X-rays, an amount of emitted electrons, a collision speed, and a focal point size are determined according to a voltage, a geometric shape, and a position of each part, and these are factors which determine resolution and quality of a radiographic image. In particular, in the case of an emitter which is an emission source of electrons based on CNTs, uniformity and performance of field emission may depend on a shape or a bonding structure of the emitter.

In a cold cathode X-ray tube using CNTs in the related art, a field emission assembly having a structure, in which a linear yarn is cut at a predetermined length and is fixed to a holder so that the cut surface faces an anode, is used. When an electric field is generated in such an X-ray tube, electrons may be emitted from the cut surface of the yarn.

BRIEF SUMMARY

However, in the case of the field emission assembly in the related art, there is a matter in which the cut surface of a CNT fiber is not always constant, and thus, there is a limitation in that uniformity of a field emission characteristic and a lifetime of an electromagnetic wave generator is degraded.

In addition, as the uniformity of the field emission characteristic is degraded, there is a limitation in precisely controlling a generation amount or intensity of electromagnetic waves.

One or more embodiments of the present disclosure addresses the various technical problems in the related art including the problems identified above.

An aspect provides a field emission assembly capable of improving uniformity of a field emission characteristic of an emitter and a lifetime of an electromagnetic wave generator, and an electromagnetic wave generator including the same.

Another aspect also provides a field emission assembly capable of more precisely controlling a generation amount or intensity of electromagnetic waves, and an electromagnetic wave generator including the same.

According to an aspect, there is provided a field emission assembly including a linear emitter which includes carbon nanotube (CNT) fibers and emits electrons, and a holder configured to fix the emitter, wherein both ends of the emitter are fixed to the holder, and the emitter includes at least one of a curved portion so as to form a peak in an electron emission direction and a bent portion so as to form a peak in the electron emission direction.

In this way, it is possible to improve the uniformity of a field emission characteristic in an emitter and a lifetime of the electromagnetic wave generator.

In addition, the controlling of a generation amount or an intensity of electromagnetic waves may be more precisely performed.

In addition, the emitter may be convexly curved to form the peak in the electron emission direction or may be bent to form the peak in the electron emission direction.

In addition, based on a front end of the emitter in the electron emission direction, the both sides of the emitter may be close to each other in the electron emission direction or some regions may be in parallel with each other when the both sides of the emitter are close to each other in the electron emission direction.

In addition, the emitter may have a shape in which a slope of a tangent line is continuously varied.

In addition, the emitter may be convexly curved in the electron emission direction, and a curvature radius of a front end of the emitter in the electron emission direction may be formed smaller than those of other portions of the emitter.

In addition, the emitter may be formed of a primary twisted yarn formed by twisting a plurality of CNT fibers.

In addition, the emitter may be formed of a secondary twisted yarn, the secondary twisted yarn may be formed by twisting a plurality of primary twisted yarns, and the primary twisted yarn may be formed by twisting a plurality of CNT fibers.

In addition, the emitter may be formed of a braided yarn.

In addition, the braided yarn may be formed by braiding a plurality of CNT fibers.

In addition, the braided yarn may be formed by braiding a plurality of primary twisted yarns, and the primary twisted yarn may be formed by twisting a plurality of CNT fibers.

In addition, the braided yarn may be formed by braiding a plurality of secondary twisted yarns, the secondary twisted yarn may be formed by twisting a plurality of primary twisted yarns, and the primary twisted yarn may be formed by twisting a plurality of CNT fibers.

In addition, the both ends of the emitter may be spaced apart from each other and fixed to the holder.

In addition, two fixing holes capable of fixing the emitter may be formed in the holder, and the both ends of the emitter may be fixed to the two fixing holes, respectively.

In addition, the two fixing holes may be disposed in a direction perpendicular to the electron emission direction.

In addition, the both ends of the emitter may be adjacent to each other and fixed to the holder.

In addition, one fixing hole capable of fixing the emitter may be formed in the holder, and all the both ends of the emitter may be fixed to the holder.

In addition, the holder may be formed in a pipe shape extending in the electron emission direction, and the fixing hole may be formed at a front end of the holder in the electron emission direction.

In addition, the holder may include two members divided based on a plane passing through points where the both ends of the emitter are fixed, and a coupling member configured to couple the two members; and the both ends of the emitter may be disposed between the two members, pressurized by the two members by tightening the coupling member, and fixed to the holder.

In addition, the holder may be disposed behind the emitter in the electron emission direction.

According to another aspect, there is provided an electromagnetic wave generator including a field emission assembly including a linear emitter which has carbon nanotube (CNT) fibers and emits electrons, and a holder configured to fix the emitter; and an anode in which electrons emitted from the field emission assembly collide to generate electromagnetic waves, wherein both ends of the emitter are fixed to the holder, and the emitter includes at least one of a curved portion so as to form a peak toward the anode and a bent portion so as to form a peak toward the anode.

In addition, the holder may be disposed at a side opposite to the anode based on the emitter.

In addition, based on the front end of the emitter in the electron emission direction, the both sides of the emitter may be close to each other toward the anode or some regions may be in parallel with each other when the both sides of the emitter are close to each other toward the anode.

In addition, the electromagnetic wave may have a wavelength ranging from 0.001 nm to 10 nm.

Additional aspects of example embodiments will be set forth in part in the description which follows and, in part, will be apparent from the description, or may be learned by practice of the disclosure.

BRIEF DESCRIPTION OF THE SEVERAL VIEWS OF THE DRAWINGS

These and/or other aspects, features, and advantages of the disclosure will become apparent and more readily appreciated from the following description of example embodiments, taken in conjunction with the accompanying drawings of which:

FIG. 3 is a front view illustrating the field emission assembly according to one example embodiment of the present disclosure;

FIGS. 6A to 6D is a diagram illustrating a formation process of an emitter of the field emission assembly according to one example embodiment of the present disclosure;

DETAILED DESCRIPTION

Figure 1:
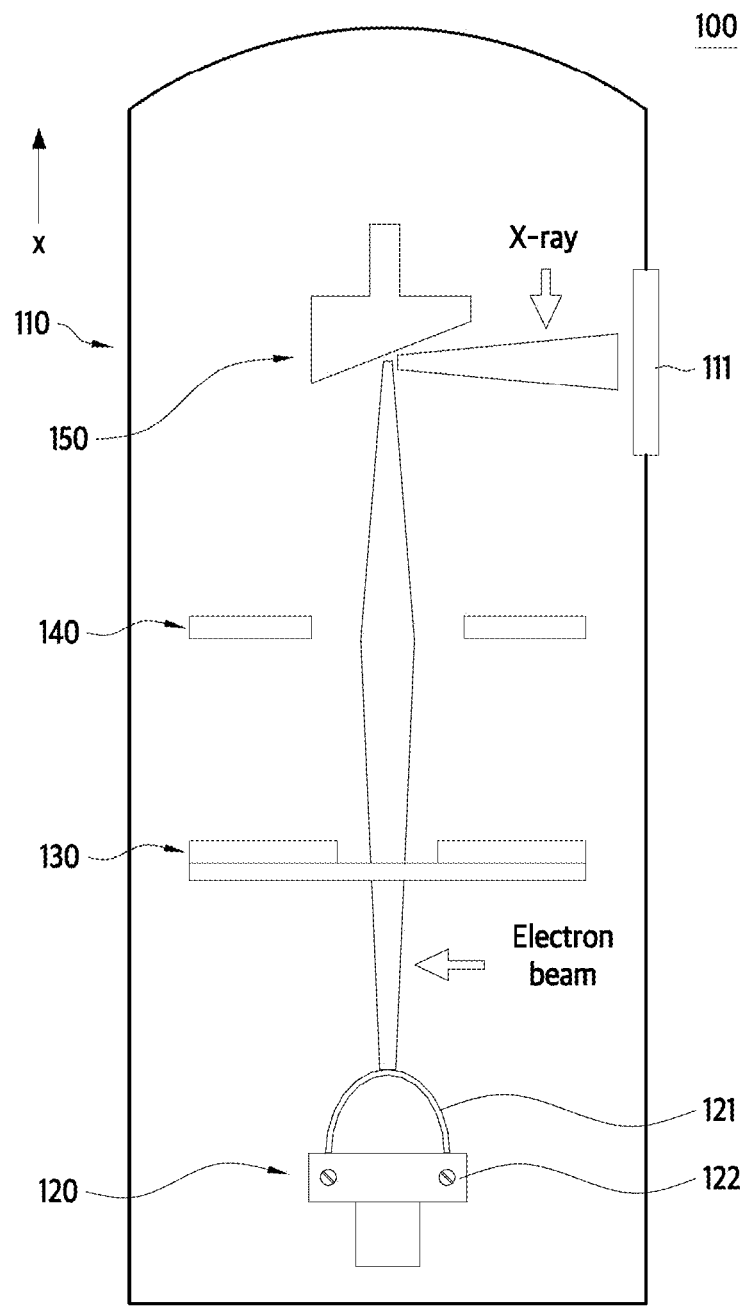
FIG. 1 is a conceptual diagram illustrating an electromagnetic wave generator including a field emission assembly according to one example embodiment of the present disclosure.

The terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it needs to be noted that the terms used herein need to be construed based on practical meanings thereof and the whole content of this specification, rather than being simply construed based on names of the terms.

As used herein, suffixes "module" and "portion" for a component of the present disclosure are used or interchangeably used solely for ease of preparation of the specification, and do not have different meanings and each of them does not function by itself. Further, regarding the description of the example embodiments of the present disclosure, the detailed description of the related known technologies may be omitted when such description is determined to possibly confuse the essence of the example embodiments included in the present disclosure. Further, the accompanying drawings are merely to make it easier to understand the example embodiments included in the present disclosure and the technical idea of the present disclosure is not limited thereto, and they need to be construed to include all of modification, equivalence and replacement involved in the idea and the technical scope of the present disclosure.

The terms including ordinal numbers such as "first" and "second" may be used to describe different constituent elements, which are not limited thereto. The terms are used merely for the purpose of distinguishing one component from another component.

When a component is referred to as being "connected" or "coupled" to another component, the component may be directly connected or coupled to another component, but it needs to be understood that sill another component may be present between the component and another component. On the contrary, when a component is referred to as being "directly connected" or "directly coupled" to another, it needs to be understood that still another component may not be present between the component and another component.

Unless the context clearly dictates otherwise, the singular form includes the plural form.

As used herein, the term "comprising" or "having" is intended to indicate that there may be the features, numbers, steps, operations, components, parts or a combination thereof, disclosed in this disclosure, but need not be understood as excluding the case that there is one or more of other features, numbers, steps, operations, components, parts or a combination thereof, or the possibility of adding the same.

The expression "at least one of A, B, and C" may include the following meanings: A alone; B alone; C alone; both A and B together; both A and C together; both B and C together; and all three of A, B, and C together.

Example embodiments of the present disclosure will be fully described in a detail below which is suitable for implementation by those skilled in the art with reference to the accompanying drawings. However, the present disclosure may be implemented in various different forms, and thus it is not limited to example embodiments to be described herein.

Hereinafter, example embodiments of the present disclosure will be described in detail with reference to the accompanying drawings.

FIG. 1 is a conceptual diagram illustrating an electromagnetic wave generator including a field emission assembly according to one example embodiment of the present disclosure.

The electromagnetic wave generator 100 according to a first example embodiment of the present disclosure may include a housing 110, a field emission assembly 120, a gate electrode 130, a focusing part 140, and an anode 150. However, some of these components may be omitted and implemented, and additional components are not excluded.

Hereinafter, an electron emission direction x may be understood as a direction from the field emission assembly 120 toward the anode 150, that is, an upward direction based on FIGS. 1 and 4A to 4C.

Referring to FIG. 1, the electromagnetic wave generator 100 may include the housing 110. The housing 110 may accommodate components such as the field emission assembly 120, the gate electrode 130, and the anode 150. An interior of the housing 110 may be maintained in a vacuum state or may be maintained close to a vacuum state.

An irradiation part 111 may be provided in the housing 110. Electromagnetic waves generated from the anode 150 may be emitted to the outside of the housing 110 through the irradiation part 111. However, alternatively, the housing 110 may be entirely formed of a transparent material such as glass so that electromagnetic waves generated from the anode 150 may pass therethrough. In this case, a separate irradiation part 111 may not be provided. In addition, when an intensity of the generated electromagnetic waves is strong, since the electromagnetic waves may pass through the opaque material, the housing 110 may be formed of an opaque material without providing the irradiation part 111.

The electromagnetic wave generator 100 may include the field emission assembly 120. The field emission assembly 120 may be a portion from which electrons are emitted due to an electric field. The field emission assembly 120 may serve as a cathode to which a positive voltage is applied.

The field emission assembly 120 may include an emitter 121 for emitting electrons, and a holder 122 for fixing the emitter 121. A detailed structure of the field emission assembly 120 will be described in detail below with reference to FIGS. 2 and 4A to 4C.

The field emission assembly 120 of the electromagnetic wave generator 100 according to one example embodiment of the present disclosure may be a cold cathode. Specifically, in the electromagnetic wave generator 100 according to one example embodiment of the present disclosure, electrons included in the emitter 121 may be emitted by a voltage applied between the field emission assembly 120 and the gate electrode 130 without separately applying heat to the emitter 121.

The electromagnetic wave generator 100 may include the gate electrode 130. The gate electrode 130 may be disposed between the emitter 121 and the anode 150. More specifically, the gate electrode 130 may be disposed between the emitter 121 and the anode 150 to be closer to the emitter 121.

The gate electrode 130 may induce electron emission from the emitter 121. Electrons included in the emitter 121 may be emitted due to a voltage applied between the gate electrode 130 and the emitter 121. In some embodiments, the gate electrode 130 may preferentially serve to withdraw electrons from the emitter 121.

However, the present disclosure is not limited thereto, and the electromagnetic wave generator 100 may not include the gate electrode 130. In this case, electrons included in the emitter 121 may be emitted due to a voltage applied between the focusing part 140, which will be described below, and the field emission assembly 120 or between the anode 150 and the field emission assembly 120.

The electromagnetic wave generator 100 may include the focusing part 140. The focusing part 140 may be disposed between the gate electrode 130 and the anode 150 or between the field emission assembly 120 and the anode 150.

As a voltage is applied, the focusing part 140 may focus an electron beam passing through the gate electrode 130. The focusing part 140 may be referred to as a lens. In addition, the focusing part 140 may further accelerate the electron beam passing through the gate electrode 130. Specifically, when a voltage is generated between the focusing part 140 and the gate electrode 130, the electrons passing through the gate electrode 130 may be accelerated due to an electric field formed by the voltage applied between the focusing part 140 and the gate electrode 130. As described above, the type of the electromagnetic wave generator 100 provided with the focusing part 140 may be referred to as a triode type generator.

However, the present disclosure is not limited thereto, and when the focusing performance of the gate electrode 130 itself is good or excellent, the focusing part 140 may not be provided. As described above, the type of the electromagnetic wave generator 100 not provided with the focusing part 140 may be referred to as a diode type generator.

The electromagnetic wave generator 100 may include the anode 150. The anode 150 may be disposed at a side opposite to the field emission assembly 120 in an interior space of the housing 110. The anode 150 may be disposed behind the gate electrode 130 and/or the focusing part 140 in a propagation direction of the electron beam. The anode 150 is a portion to which a positive voltage (+) is applied and may be referred to as an anode or may be referred to as a target as meaning of a target to which the electron beam hits.

Electromagnetic waves may be formed in the anode 150. Specifically, after the electron beam emitted from the emitter 121 is accelerated while passing through the gate electrode 130 and/or the focusing part 140, the electron beam may collide with the anode 150, and in this case, the electron beam may generate electromagnetic waves such that a material constituting the anode 150 is excited by the electron beam and then returned to its original state.

The electromagnetic wave emitted from the electromagnetic wave generator 100 may have a wavelength ranging from 0.001 nm to 10 nm. For example, the electromagnetic wave generator 100 may emit X-ray having a wavelength ranging from 0.001 nm to 10 nm. More specifically, the electromagnetic wave generator 100 may emit X-ray having a wavelength ranging from 0.01 nm to 10 nm.

Figure 2:
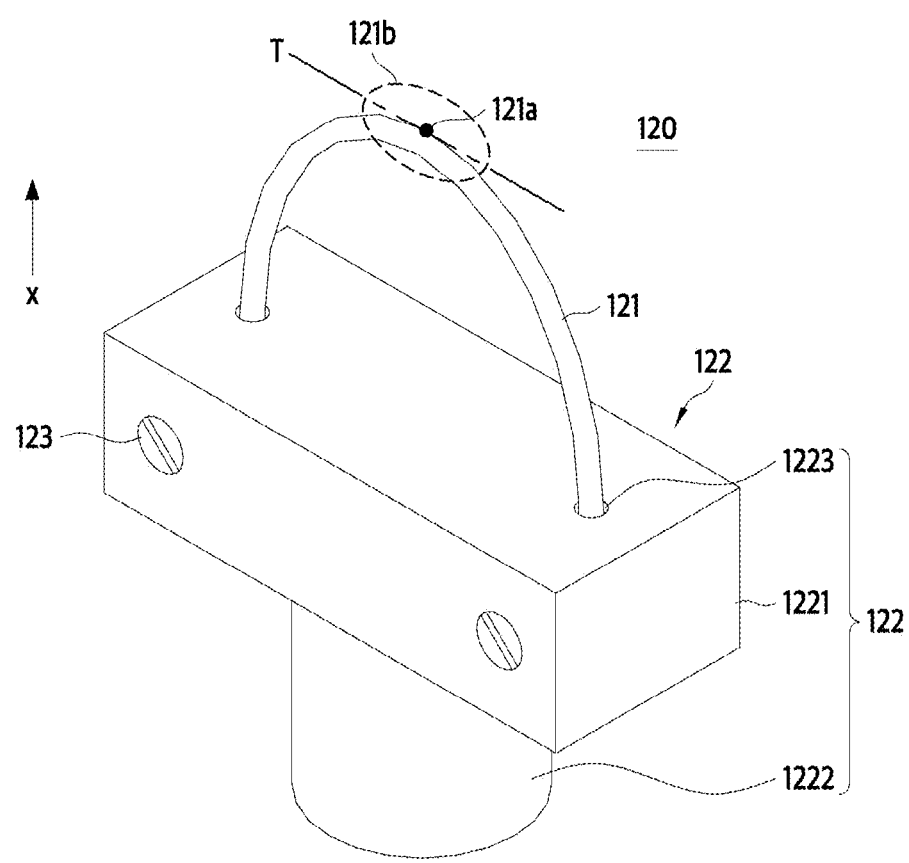
FIG. 2 is a perspective view illustrating the field emission assembly according to one example embodiment of the present disclosure.
Figure 4A:
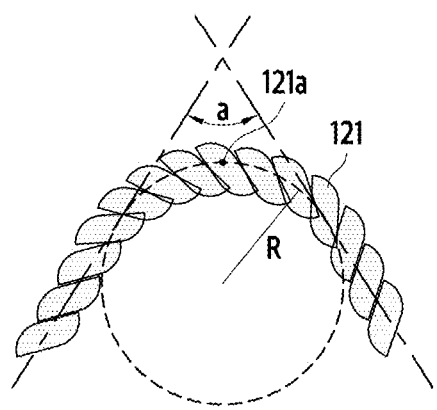
FIGS. 4A to 4C is a diagram illustrating various aspects of an emitter of the field emission assembly according to one example embodiment of the present disclosure.
Figure 4B:
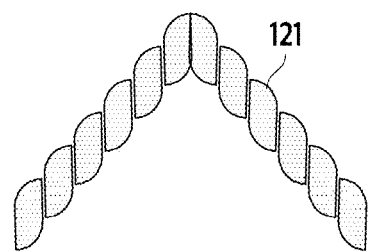
Figure 4C:
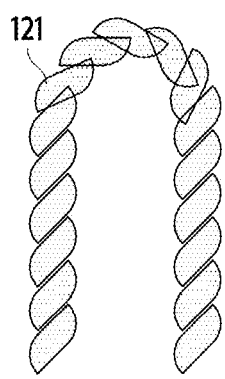

FIG. 2 is a perspective view illustrating the field emission assembly according to one example embodiment of the present disclosure. FIG. 3 is a front view illustrating the field emission assembly according to one example embodiment of the present disclosure. FIGS. 4A to 4C is a diagram illustrating various aspects of an emitter of the field emission assembly according to one example embodiment of the present disclosure.

The field emission assembly 120 according to one embodiment of the present disclosure may include the emitter 121 and the holder 122, but may be implemented except for some of them, and does not exclude additional components.

The field emission assembly 120 may include the emitter 121. The emitter 121 may include CNT fibers through which electrons may easily move. However, the present disclosure is not limited thereto, and the emitter 121 may be formed of various materials capable of emitting electrons.

The emitter 121 may have a linear shape. Specifically, the emitter 121 may be formed of a yarn formed by gathering CNT fibers, and the yarn may have a linear shape.

The emitter 121 may include at least one of a portion curved to form a peak in an electron emission direction x and a portion bent to form a peak in the electron emission direction x. In other words, the emitter 121 may include a portion curved so as to be convex in the electron emission direction x, a portion bent to protrude in the electron emission direction x, or both the curved portion and the bent portion. The peak may be understood to mean a peak formed to be directed in the electron emission direction x, that is, a point relatively closer in the electron emission direction x than a peripheral region.

Hereinafter, the linear emitter 121 in which the peak is formed may be referred to as a bent fiber.

When an electric field is applied to the emitter 121, the electrons included in the emitter 121 and/or the electrons passing from the holder 122 to the emitter 121 may be induced to a region near a peak of a protruding portion of the emitter 121 in the electron emission direction x and then may be emitted to the outside of the emitter 121. This is distinguished from the form in the related art in which a cut end of a linear emitter is disposed at a front end of the electron emission direction x (that is, a shape in which merely one end of both ends of the linear emitter is fixed to the holder), and electrons are emitted from the cut end.

As an example, the emitter 121 may have a shape in which a slope of a tangent line is continuously varied. This may mean that the emitter 121 has a smoothly curved shape without a sharply curved portion. In this case, since the movement of the electrons inside the emitter 121 may be more facilitated, electron emission may be made effectively.

As another example, the emitter 121 may include a bent (for example, sharply bent) portion. In this case, it may be beneficial that the emitter 121 is bent to form a peak in the electron emission direction x. Specifically, when an electric field is applied to the emitter 121, the electrons may be induced to a portion protruding from the emitter 121 in the electron emission direction x and then emitted to the outside of the emitter 121. In this case, when the emitter 121 includes a bent portion to form the peak in the electron emission direction x, the electrons may be easily concentrated to a bent point of the emitter 121, and thus a repulsion force between the electrons may be increased so that the electrons may be easily emitted to the outside of the emitter 121. In addition, since the electrons are concentrated and emitted at the bent point, a formation position of an electron emission point may be easily controlled.

Hereinafter, the field emission assembly 120 according to one embodiment of the present disclosure will be described in detail.

Hereinafter, in the field emission assembly 120 according to one embodiment of the present disclosure, since the emitter 121 is formed as a single peak, a peak 121a may be the same point as the frontmost point (hereinafter, referred to as a "front end 121a") of the emitter 121 in the electron emission direction x.

Referring to FIGS. 2 and 3, the emitter 121 of the field emission assembly 120 according to one embodiment of the present disclosure may be curved to form the peak 121a in the electron emission direction x or bent to form the peak 121a in the electron emission direction x. Based on FIG. 1, the emitter 121 may be curved to form the peak 121a toward the anode 150 shown in FIG. 1 or bent to form the peak 121a toward the anode 150 shown in FIG. 1. It may be understood that the emitter 121 of the field emission assembly 120 according to one embodiment of the present disclosure is curved to have one peak or bent to have one peak. The emitter 121 in the form of one peak has a simple shape so that the field emission assembly 120 may be manufactured consistently. Thus, uniformity of the field emission characteristic and the lifetime of the electromagnetic wave generator 100 may be improved.

When an electric field is applied to the emitter 121, the electrons included in the emitter 121 and/or the electrons passing from the holder 122 to the emitter 121 may be induced to a region (hereinafter, referred to as a "front side portion 121b") near the front end 121a of the emitter 121 in the electron emission direction x and then may be emitted to the outside of the emitter 121 in the front side portion 121b.

Through the above electron emission method, non-uniformity due to cutting of the emitter 121 may be reduced or eliminated, and accordingly, the uniformity of the field emission characteristic and the lifetime of the electromagnetic wave generator 100 may be improved. In addition, due to the improvement of the uniformity of the field emission characteristic, controlling of a generation amount or an intensity of electromagnetic waves may be more precisely performed. In addition, field emission performance, such as a threshold value for electron emission and a max current value that is a maximum value of a current formed due to electron emission, may be improved.

Based on the front end 121a of the emitter 121 in the electron emission direction x, both sides of the emitter 121 may become closer to each other in the electron emission direction x. However, some regions may be in parallel with each other. Referring to FIG. 1, based on the front end 121a of the emitter 121 in the electron emission direction x, the both sides of the emitter 121 may be closer to each other toward the anode 150 shown in FIG. 1 or some regions may be in parallel with each other. That is, it can be understood that, portions that are farther away from each other in the electron emission direction x are not formed based on both ends of the emitter 121 fixed to the holder 122. In this way, the electrons included in the emitter 121 may be more easily induced to the front side portion 121b of the emitter 121.

In contrast, based on the front end 121a of the emitter 121 in the electron emission direction x, the both sides of the emitter 121 may include some portions that move away from each other in the electron emission direction x (e.g., a ring shape). For example, in a state in which a distance between two fixing holes 1223 is fixed, when a curvature radius of the front end 121a of the emitter 121 in the electron emission direction x is increased to a predetermined level or more according to a required field emission characteristic, or when the curvature radius of the front end 121a in the electron emission direction x is fixed, when a gap between the two fixing holes 1223 is decreased to a predetermined level or more due to a structural restriction, portions more protruding toward both sides than the two fixing holes 1223 may be formed in the emitter 121, and in this case, the emitter 121 may include portions farther away from each other in the electron emission direction x.

The emitter 121 may be symmetrically formed in a left-right direction. Specifically, the emitter 121 may be formed symmetrically with respect to a central axis extending in the electron emission direction x. In this way, uniformity of the shape of the emitter 121 may be improved, and thus this may mean that the uniformity of the field emission characteristic and the lifetime of the electromagnetic wave generator 100 is improved.

Hereinafter, the curvature radius R of the emitter 121 will be described in detail with reference to FIGS. 4A and 4B.

The emitter 121 may be bent or curved according to a required field emission characteristic. When the emitter 121 is curved, the front end 121a of the emitter 121 in the electron emission direction x may be formed at various curvature radii R.

For example, as shown in FIG. 4A, when the front end 121a of the emitter 121 in the electron emission direction x is curved at a large curvature radius R, the front side portion 121b of the emitter 121 in the electron emission direction x may be formed in a blunt shape. In this case, a threshold voltage difference value at which the electrons starts to be emitted and a max current value that is a maximum current value may be increased.

On the other hand, when the front end 121a of the emitter 121 in the electron emission direction x is curved at a small curvature radius R or is bent as shown in FIG. 4B, the front side portion 121b of the emitter 121 in the electron emission direction x may be formed in a more pointed shape. In this case, a threshold voltage difference value at which the electrons starts to be emitted and a max current value that is a maximum current value formed due to the emitted electrons may be decreased.

The curvature radius of emitter 121 is not required to be the same according to the region. That is, the emitter 121 may have a different curvature radius according to the region. The curved shape of the emitter 121 may be determined according to a thickness and a length of the linear emitter 121, the distance between the fixed ends, a fixed angle between the fixed ends, and a type of a twisted yarn which will be described with reference to FIGS. 6A to 6D. Furthermore, when permanent deformation is caused due to an external force, the emitter 121 may have a shape corresponding to the permanent deformation.

When the emitter 121 is formed to be curved such that the peak 121a is formed in the electron emission direction x, the curvature radius R of the front end 121a of the emitter 121 in the electron emission direction x may be smaller than those of other portions of the emitter 121. A small curvature radius may mean as being sharply curved. In order for the electrons to be smoothly induced to the front side portion 121b of the emitter 121 due to the electric field, it is beneficial that portions other than the front end 121a of the emitter 121 in the electron emission direction x is curved bent as gently as possible when compared to the front end 121a of the emitter 121 in the electron emission direction x.

Hereinafter, a bending angle 'a' of the emitter 121 will be described in detail with reference to FIGS. 4A and 4C.

Referring to FIGS. 4A and 4C, the emitter 121 may be formed at various bending angles according to an aspect of being fixed to the holder 122. In this case, the bending angle 'a' may be understood as an angle formed by tangent lines of both side portions coupled to the holder 122 of the emitter 121.

For example, as shown in of FIG. 4A, when the both ends of the emitter 121 are fixed to the holder 122 at a sufficient interval from each other, the bending angle 'a' may be increased.

Conversely, when the both ends of the emitter 121 are fixed to the holder 122 to be close to each other so that a gap between the both ends of the emitter 121 is narrow, the bending angle 'a' may become small, and further, as shown in of FIG. 4C, the tangent lines at the both ends of the emitter 121 may be in parallel with each other or may be close to be parallel. Through the above structure, even when the holder 122 is formed in a small size due to a structural limitation or the both ends of the emitter 121 need to be fixed to the holder 122 to close to each other, the emitter 121 may be provided in a bent fiber manner.

Referring to FIGS. 2 and 3, the field emission assembly 120 may include the holder 122. The both ends of the emitter 121 may be fixed to the holder 122. The holder 122 may be disposed behind the emitter 121 in the electron emission direction x. Referring to FIG. 1, it can be understood that the holder 122 is disposed at a side opposite to the anode 150 shown in FIG. 1 based on the emitter 121.

The holder 122 may be formed of an electrically conductive material capable of conducting electricity. Specifically, the holder 122 may be made of a material having electrical conductivity and mechanical strength that is not deformed by repulsive forces of electrons accumulated in the field emission assembly 120. For example, the holder 122 may be made of one or more materials selected from the group consisting of tungsten, zinc, nickel, copper, silver, aluminum, gold, platinum, tin, stainless steel, and conductive ceramic. When an electric field is applied to the field emission assembly 120, electrons may move to the emitter 121 through the holder 122 formed of an electrically conductive material and then may be emitted to the outside of the emitter 121.

The holder 122 may include a fixing part 1221. The fixing part 1221 may be disposed in front of a base 1222 in the electron emission direction x. The fixing part 1221 may fix the emitter 121. In the electromagnetic wave generator 100 according to one embodiment of the present disclosure, a front surface of the fixing part 1221 in the electron emission direction x may include a front surface extending in a direction intersecting the electron emission direction x, that is, a horizontal direction. The both ends of the emitter 121 may be respectively inserted into and fixed to the front surface of the fixing part 1221.

The holder 122 may include the base 1222. The base 1222 may be formed behind the fixing part 1221 based on the electron emission direction x. That is, the base 1222 may be formed at a side opposite to the anode 150 based on the fixing part 1221. The base 1222 may be a portion coupled to another fixing member disposed behind the field emission assembly 120 in the electron emission direction x. In the field emission assembly 120 according to one embodiment of the present disclosure, the base 1222 may have a cylindrical shape.

A fixing hole 1223 may be formed in the holder 122. Two fixing holes 1223 may be formed. The fixing hole 1223 may fix the emitter 121. Specifically, the both ends of the emitter 121 may be respectively fixed to the two fixing holes 1223.

The two fixing holes 1223 may be disposed in a direction perpendicular to the electron emission direction x. In this way, since the emitter 121 may form a symmetric shape in a left-right direction, uniformity of the field emission characteristics may be improved.

The holder 122 may be integrally formed. The fixing hole 1223 may be a hole formed in the front surface of the fixing part 1221 in the electron emission direction x. In this case, when the emitter 121 is coupled to the holder 122, the both ends of the emitter 121 may be respectively inserted into the fixing holes 1223, may be formed on a side surface of the fixing part 1221, and may be disposed at positions overlapping holes where coupling members 123 is coupled. In this case, when the separate coupling members 123 are coupled to the holes to pressurize the emitter 121, the emitter 121 may be coupled to the holder 122.

Alternatively, the holder 122 may be provided in the form of a coupling of a plurality of members. For example, the holder 122 may include two members divided based on a plane passing points where the both ends of the emitter 121 are fixed, and a coupling member for coupling the two members constituting the holder 122. The both ends of the emitter 121 are disposed between the two members constituting the holder 122, and then the coupling member is tightened so that the both ends of the emitter 121 are pressurized by the two members constituting the holder 122 to be fixed to the holder 122.

In this case, each of the two members constituting the holder 122 may have a groove capable of forming the fixing hole 1223 when the two members are combined with each other, and the grooves may guide positions of the both ends of the emitter 121 between the two members constituting the holder 122. However, the present disclosure is not limited thereto, and when the both ends of the emitter 121 may be easily guided by other portions of the holder 122, the grooves forming the fixing holes 1223 may not be formed in the two members of the holder 122. In this case, the both ends of the emitter 121 may be fixed by being pressurized by opposite surfaces of the two members constituting the holder 122 as the coupling member is tightened.

Alternatively, the holder 122 may include a separate mechanical mechanism to which the both ends of the emitter 121 may be fixed. Alternatively, the emitter 121 may be fixed to the holder 122 through an adhesive or by welding. As described above, as long as the emitter 121 may be fixed to be curved or bent convexly in the electron emission direction x, the holder 122 is not limited to the above-described structure and may be formed in various manners.

Figure 5A:
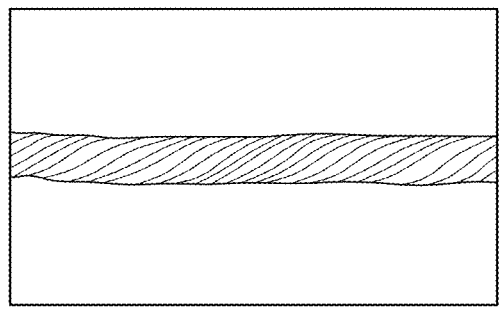
FIGS. 5A and 5B are line drawings illustrating a linear emitter of the field emission assembly according to one example embodiment of the present disclosure.
Figure 5B:
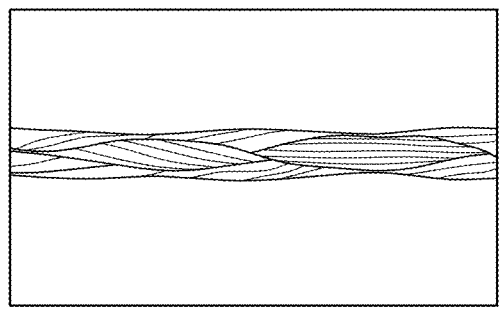

FIGS. 5A and 5B are line drawings illustrating a linear emitter of the field emission assembly according to one example embodiment of the present disclosure. FIGS. 6A to 6D is a diagram illustrating a formation process of an emitter of the field emission assembly according to one example embodiment of the present disclosure.

Referring to FIGS. 5A and 5B, the emitter 121 may be formed by curving or bending a linear yarn formed of CNT fibers. Specifically, referring to FIG. 5A, the emitter 121 may be formed of a twisted yarn. In this case, since the emitter 121 may be manufactured more easily, manufacturing efficiency may be improved. In addition, referring to FIG. 5B, the emitter 121 may be formed of a braided yarn. In this case, since mechanical and electrical properties of the emitter 121 may be improved, a field emission characteristic may also be improved. The physical properties of the twisted yarn and the braided yarn will be described below in detail with reference to FIGS. 9A to 9D, 10 and 11.

FIGS. 6A to 6D shows in detail a process of forming the emitter 121 of the field emission assembly 120 according to one embodiment of the present disclosure.

Referring to FIG. 6A, the emitter 121 may be formed of a primary twisted yarn formed by twisting a plurality of CNT fibers.

Referring to FIG. 6B, the emitter 121 may be formed of a secondary twisted yarn. In this case, the secondary twisted yarn may be formed by twisting a plurality of the primary twisted yarns, and the primary twisted yarn may be formed by twisting a plurality of CNT fibers. In this case, a process of forming the secondary twisted yarn by twisting the primary twisted yarns may be referred to as doubling.

Referring to FIG. 6C, the emitter 121 may be formed of braided yarns. In this case, the braided yarn may be formed by braiding a plurality of the primary twisted yarns, and the primary twisted yarn may be formed by twisting a plurality of CNT fibers.

Referring to FIG. 6D, the emitter 121 may be formed of the braided yarns. In this case, the braided yarn may be formed by braiding a plurality of the secondary twisted yarns with each other. The secondary twisted yarn may be formed by twisting a plurality of the primary twisted yarns, and the primary twisted yarn may be formed by twisting a plurality of CNT fibers. In this case, a process of forming the secondary twisted yarn by twisting the primary twisted yarns may be referred to as doubling.

However, when the emitter 121 may be formed in a linear shape, a method of forming the emitter 121 is not limited to the method described above with reference to FIGS. 6A to 6D, and the emitter 121 may be formed according to a required field emission characteristic in various combinations of the methods shown in FIGS. 6A to 6D or may be formed in a method not described in FIGS. 6A to 6D. For example, when the braided yarn is formed, it may be beneficial to perform braiding using a twisted yarn having a predetermined thickness or more so as to use a braiding mechanism. However, in the case of using a braiding mechanism with very high precision, a braided yarn may be formed by directly braiding CNT fibers, each having a thin thickness.

FIGS. 7A, 7B, 8A, 8B and 8C are diagrams illustrating field emission characteristics when the emitter is provided in a cut fiber manner and when the emitter is provided in a bent fiber manner.

Figure 7A:
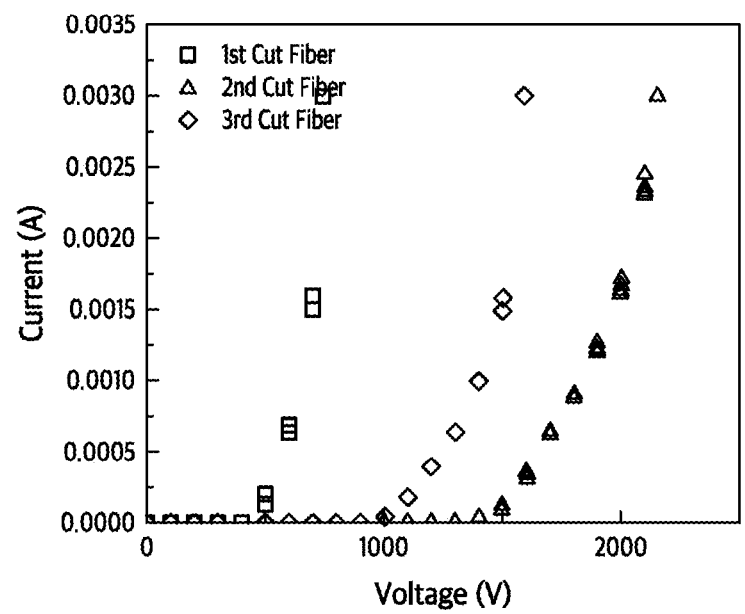
FIGS. 7A, 7B, 8A, 8B and 8C are diagrams illustrating field emission characteristics when the emitter is provided in a cut fiber manner and when the emitter is provided in a bent fiber manner.
Figure 7B:
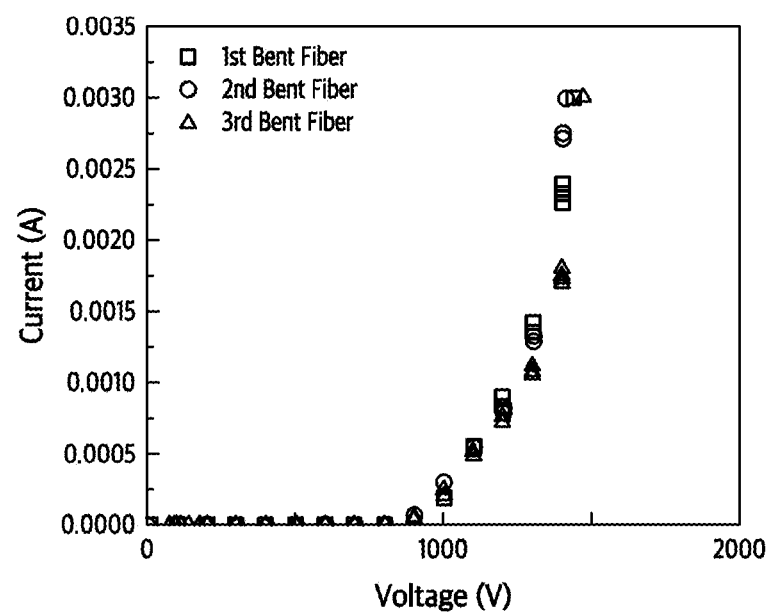

The graphs of FIGS. 7A and 7B show an electron emission amount according to a voltage applied to an electrode as a current, and it can be understood that an x-axis is a voltage and a y-axis is a current.

FIG. 7A shows three measured results of a field emission characteristic of a "cut fiber" such that an emitter made of 400 CNT fibers was cut, and then a cut surface was directed toward an anode to allow electrons to be emitted from the cut surface. FIG. 7B shows three measured results of a field emission characteristic of a "bent fiber" such that an emitter made of 400 CNT is curved to form a peak toward the anode or bent to form a peak toward the anode and electrons were emitted from the peak.

Referring to FIGS. 7A and 7B, it can be seen that even when the voltage was increased, the current was not detected up to a predetermined voltage, and when the voltage exceeded the predetermined voltage, the current was increased as the voltage was increased. In this case, it can be seen that referring to FIG. 7A, in the case of the cut fiber, a voltage at which electrons are emitted for each emitter was different for each other, and a variance of the current according to the increase of the voltage was also different, whereas referring to FIG. 7B, in the case of the bent fiber, almost no difference occurred in the field emission characteristic for each emitter. This may mean that, in the case of the bent fiber, uniformity of the field emission characteristic was excellent.

Figure 8A:
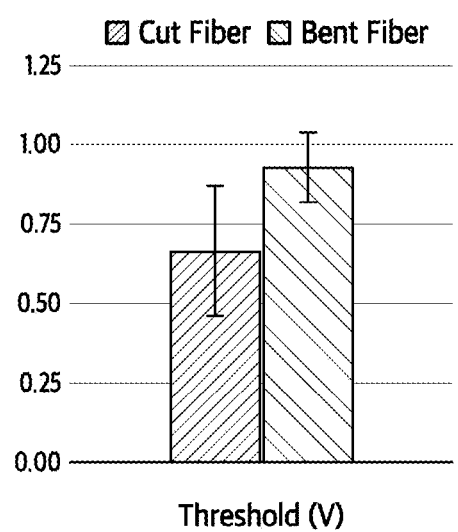

Meanwhile, FIG. 8A shows a comparison of an average value and a deviation between thresholds (minimum voltages at which electrons may be emitted from the emitter) of the cut fiber and the bent fiber. Referring to FIG. 8A, it can be seen that, in the case of the bent fiber, the average threshold value was higher than that of the cut fiber, and the deviation thereof was small.

Figure 8B:
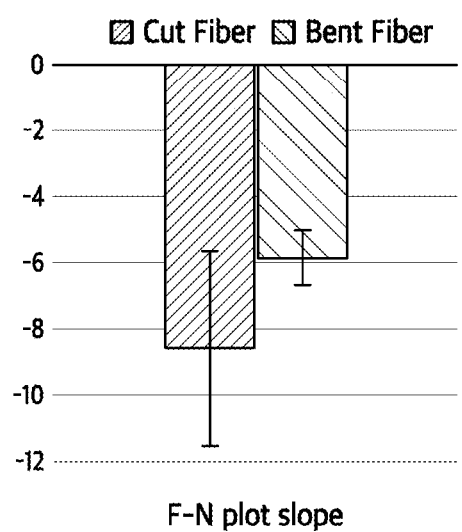

In addition, FIG. 8B shows a comparison of an average value and a deviation of Fowler-Nordheim plot slopes (F-N plot slopes) of the cut fiber and the bent fiber. The value of the F-N plot slope is an index barometer indicating sensitivity of a change in the amount of electron emission according to a change in voltage applied to the electrode, and it can be understood that the higher the absolute value of the F-N plot slope, the higher the sensitivity. Referring to FIG. 8B, it can be seen that, in the case of the bent fiber, the average value of the F-N plot slop is smaller than that of the cut fiber, and the deviation thereof is small.

Figure 8C:
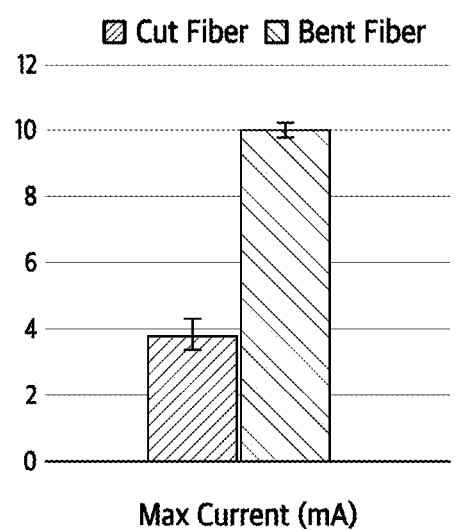

In addition, FIG. 8C shows a comparison of an average value and a deviation of max currents (the maximum value of the current generated through electrons emitted from the emitter) of the cut fiber and the bent fiber. Referring to FIG. 8C, it can be seen that, in the case of the bent fiber, the max current value was higher than that of the cut fiber, and the deviation thereof was small.

Referring to FIGS. 8A to 8C, the following Table 1 shows the average values (avg) and the population standard deviation values (std.p) for the field emission characteristics of the cut fiber and the bent fiber.

TABLE 1

|  | Threshold (V) | | F-N plot slope | | Max Current (mA) | |
| --- | --- | --- | --- | --- | --- | --- |
|  | avg | std. p | avg | std. p | Avg | std. p |
| Cut Fiber | 0.67 | 0.21 | −8.58 | 2.96 | 3.83 | 0.45 |
| Bent Fiber | 0.93 | 0.11 | −5.82 | 0.84 | 10 | 0.20 |

Referring to the std.p of each field emission characteristic in Table 1, it can be seen that, in the case of the bent fiber when compared to the cut fiber, uniformity of the threshold value was improved about 46%, uniformity of the F-N plot slope value was improved about 72%, and uniformity of the Max Current value was improved about 56%.

Referring to FIGS. 8A to 8C and the std.p in Table 1, it can be seen that the bent fiber had uniformity of the field emission characteristics that is superior to that of the cut fiber.

Meanwhile, referring to the avg of each field emission characteristic in Table 1, it can be seen that, in the case of the bent fiber when compared to the cut fiber, the average value of the threshold was improved about 40%, the average value of the F-N plot slope value was improved about 32%, and the average value of the Max Current was improved about 161%. This may mean that, in addition to the uniformity of the field emission characteristics, the bent fiber has field emission performance that is superior to that of the cut fiber.

The following Table 2 shows average values (avg) and population standard deviation values (std.p) for a thickness of the emitter of a portion where electrons are emitted from the linear emitter.

TABLE 2

|  | Thickness (mm) | |
| --- | --- | --- |
|  | avg | std. p |
| Cut Fiber | 0.46 | 0.01 |
| Bent Fiber | 0.47 | 0.0082 |

Referring to Table 2, it can be seen that the bent fiber has a small deviation in thickness value of manufactured emitters when compared to the cut fiber. This may mean that, in the case of the cut fiber, a change in thickness of the cut surface may occur during a cutting process. That is, when the emitter is formed of the bent fiber, it can be understood that the uniformity of the thickness of the portion where the electrons are emitted may be secured, thereby improving the uniformity of the field emission characteristics.

FIGS. 9A to 9D is a diagram illustrating a mechanical property according to a type of a yarn constituting the emitter.

Figure 9A:
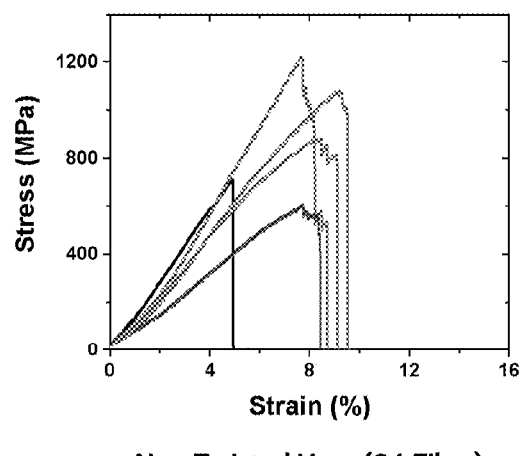
FIGS. 9A to 9D is a diagram illustrating a mechanical property according to a type of a yarn constituting the emitter.
Figure 9B:
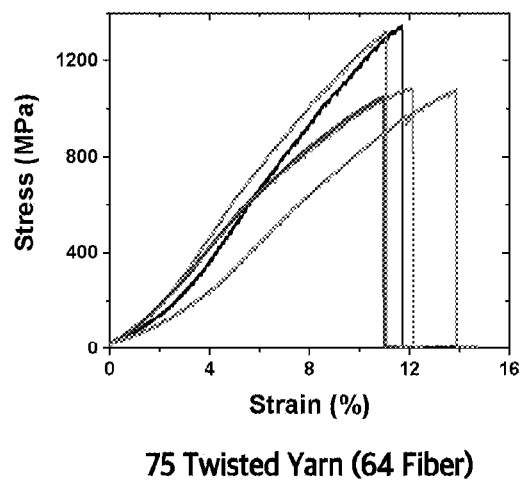
Figure 9C:
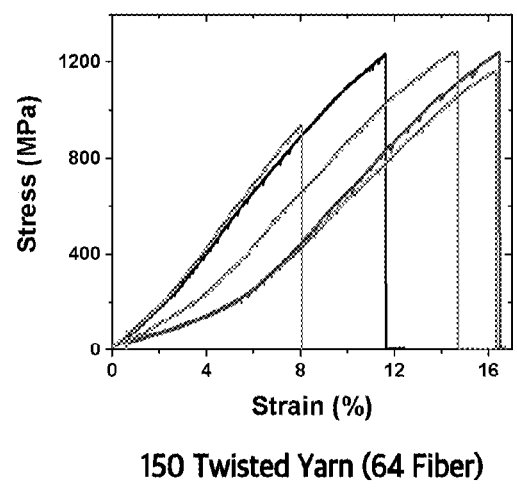
Figure 9D:
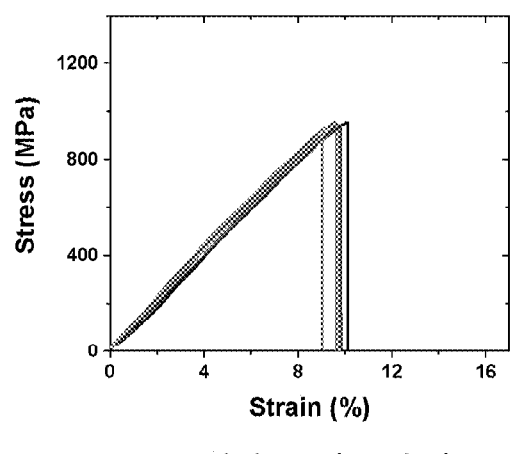

FIGS. 9A to 9D show a strain-stress curve according to a type of a yarn constituting the emitter and illustrate data after an experiment was performed a plurality of times for each case. FIG. 9A shows a case in which a strain is applied to a yarn (Non-Twisted Yarn 64 Fiber) in which 64 CNT fibers were simply collected, FIG. 9B shows a case in which a strain is applied to a twisted yarn (75 Twisted Yarn 64 Fiber) formed by twisting 64 CNT fibers 75 times, FIG. 9C shows a case in which a strain is applied to a twisted yarn (150 Twisted Yarn 64 Fiber) formed by twisting 64 CNT fibers 150 times, and FIG. 9D shows a case in which a strain is applied to a braided yarn (Braided Yarn 64 Fiber) formed by braiding 64 CNT fibers.

Referring to FIGS. 9A to 9C, when the strain was applied to the simply collected CNT fibers (the non-twisted yarn) and to the twisted yarn formed by twisting CNT fibers, it can be seen that a different stress characteristic exhibited at each experiment. On the other hand, referring to FIG. 9D, when the strain was applied to the braided yarn formed by braiding CNT fibers, it can be seen that there is almost no difference in the stress characteristic at each experiment.

The following Table 3 shows the numerical representation of mechanical properties according to the types of yarns constituting the above-described emitter.

TABLE 3

|  | Strain (%) | Stress (MPa) | Modulus (GPa) |
| --- | --- | --- | --- |
| Non-Twisted Yarn | 7.62 ± 1.47 | 901.5 ± 227.0 | 9.16 ± 2.05 |
| 75 Twisted Yarn | 11.94 ± 1.06 | 1177.0 ± 130.1 | 6.15 ± 1.35 |
| 150 Twisted Yarn | 13.51 ± 3.07 | 1163.9 ± 116.2 | 5.34 ± 2.43 |
| Braided Yarn | 9.67 ± 0.36 | 935.8 ± 26.5 | 9.55 ± 1.06 |

Referring to Table 3, it can be seen that the deviation value of strain and stress were significantly lower in a case in which the yarn constituting the emitter was formed of the braided yarn than other cases. In addition, even when looking at the value of a change ratio (Modulus) of stress according to strain, it can be confirmed that a case in which the yarn constituting the emitter was formed of the braided yarn has the smallest deviation value when compared to other cases.

Referring to FIGS. 9A to 9D and Table 3, when the yarn constituting the emitter was formed of the braided yarn, the uniformity of mechanical properties may be improved when compared to the simply collected CNT fibers (the non-twisted yarn) or to the yarn formed of the twisted yarn. In this way, since errors due to differences in the mechanical properties of the emitter may be reduced in the process of forming the field emission assembly, the uniformity of the field emission characteristics may also be improved.

Figure 10:
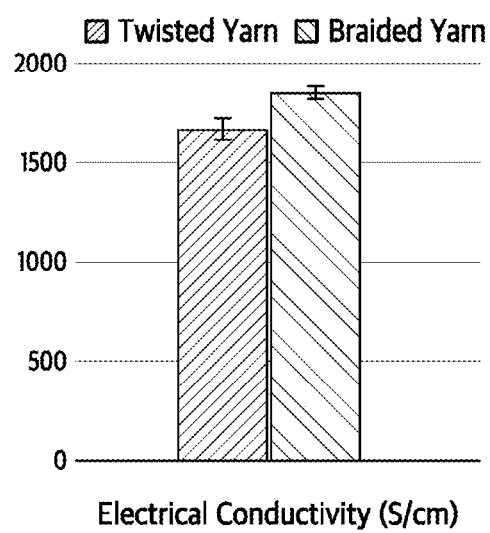
FIG. 10 is a graph illustrating electrical properties when an emitter is formed of a twisted yarn and when the emitter is formed of a braided yarn.

FIG. 10 is a graph illustrating electrical properties when an emitter is formed of a twisted yarn and when the emitter is formed of a braided yarn.

Specifically, FIG. 10 shows electrical conductivity according to the type of yarn constituting the emitter.

The following Table 4 numerically expresses average values (avg) and population standard deviation values (std.p) of the electrical properties of emitters when the emitter is formed of the twisted yarn and when the emitter is formed of the braided yarn.

TABLE 4

| | Electrical conductivity (S/cm) | |
|---|---|---|
| | avg | std. p |
| Twisted Yarn | 1670.8 | 53.6 |
| Braided Yarn | 1855.3 | 27.8 |

Referring to FIG. 10 and Table 4, when the emitter is formed of braided yarn, it can be seen that the avg of the electric conductivity characteristic was higher, and the std.p thereof was smaller when compared to a case in which the emitter is formed of the twisted yarn. That is, when the emitter is formed based on the braided yarn, the uniformity of electrical conductivity may be further improved so that the uniformity of the field emission characteristic of the emitter may also be improved.

Figure 11:
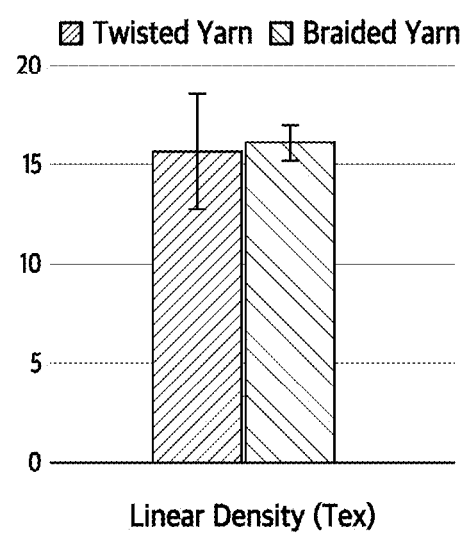
FIG. 11 is a graph showing a linear density when the emitter is formed of a twisted yarn and when the emitter is formed of a braided yarn.

FIG. 11 is a graph illustrating a linear density when an emitter is formed of a twisted yarn and when the emitter is formed of a braided yarn.

The following Table 5 numerically expresses average values (avg) and population standard deviation values (std.p) of the linear densities of emitters when the emitter is formed of the twisted yarn and when the emitter is formed of the braided yarn.

TABLE 5

| | Linear density (Tex) | |
|---|---|---|
| | avg | std. p |
| Twisted Yarn | 15.67 | 2.9 |
| Braided Yarn | 16.11 | 0.68 |

Referring to FIG. 11 and Table 5, when the emitter is formed of the braided yarn, it can be confirmed that the std.p of the linear density is smaller than that of the twisted yarn. Since an amount of a current flowing through the emitter or resistance of the emitter may be varied when the linear density is changed, it can be understood that the more uniform the linear density, the more uniform the electrical characteristic. That is, when the emitter is formed of the braided yarn, the uniformity of the linear density is excellent, and thus the electrical property may also be uniform so that the uniformity of the field emission property may also be improved.

Figure 12:
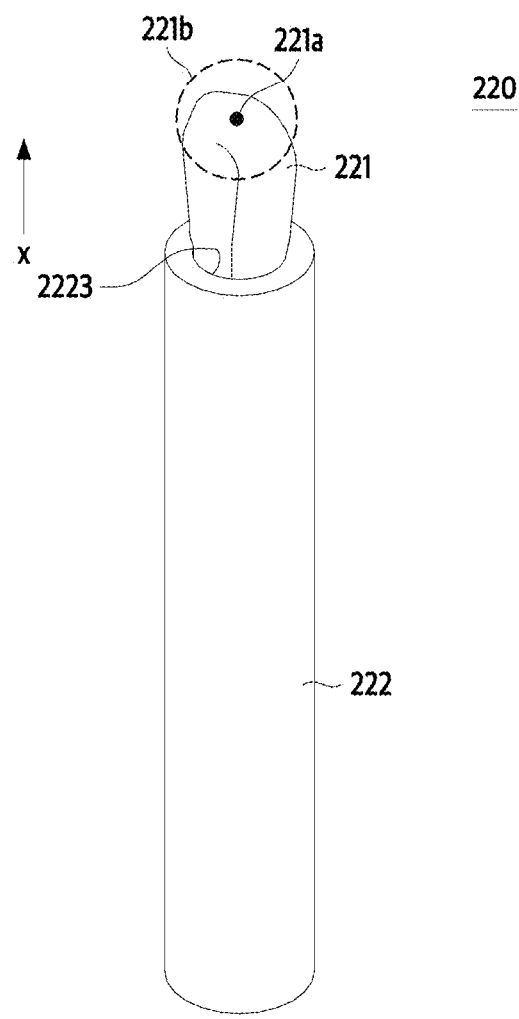
FIG. 12 is a perspective view illustrating a field emission assembly according to another example embodiment of the present disclosure.
Figure 13:
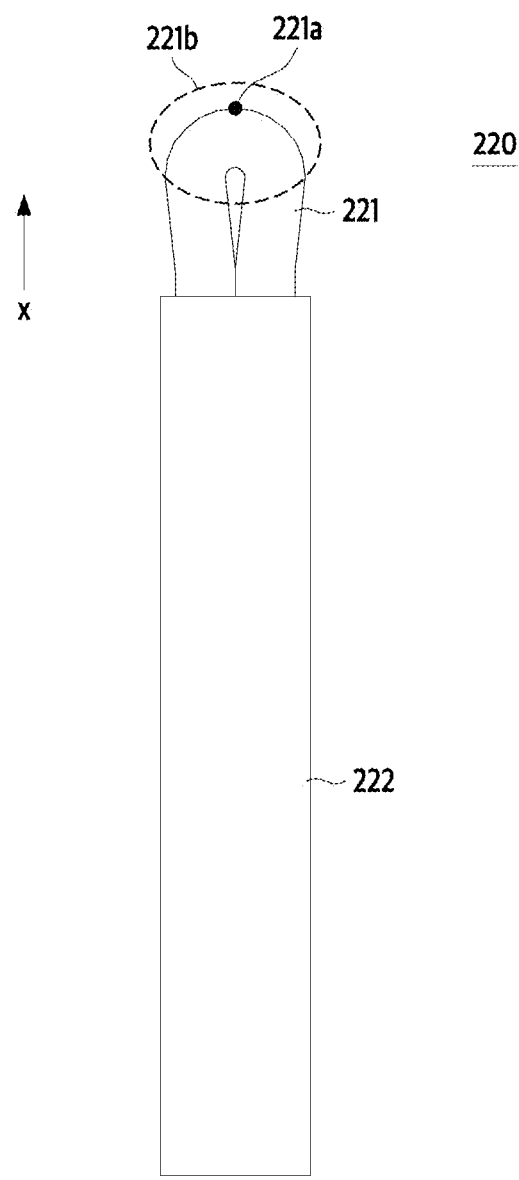
FIG. 13 is a front view illustrating the field emission assembly according to another example embodiment of the present disclosure.

FIG. 12 is a perspective view illustrating a field emission assembly according to another example embodiment of the present disclosure. FIG. 13 is a front view illustrating the field emission assembly according to another example embodiment of the present disclosure.

A detailed configuration of a field emission assembly 220 according to another embodiment of the present disclosure, which will not be described below, may be the same as the detailed configuration of the field emission assembly 120 according to one embodiment of the present disclosure described with reference to FIGS. 1 to 11.

Referring to FIGS. 12 and 13, an emitter 221 may be convexly curved or bent in the electron emission direction x so that both ends thereof may be fixed to a holder 222. The both ends of the emitter 221 may be adjacent to each other and fixed to the holder 222.

The both ends of the emitter 221 may be fixed to one fixing hole 2223 formed in the holder 222. The both ends of the emitter 221 may be in contact with each other to be fixed in parallel to the fixing hole 2223. That is, in the field emission assembly 220 of the electromagnetic wave generator according to another embodiment of the present disclosure, it can be understood that, in a state in which an intermediate portion of the linear emitter 221 is folded, the intermediate portion is fixed to the holder 222 to face the electron emission direction x.

In the field emission assembly 220 according to another embodiment of the present disclosure, both sides of the emitter 221 may be in parallel with each other based on a front end 221a of the emitter 221 in the electron emission direction x and may include portions further away from each other in the electron emission direction x.

Specifically, when a front side portion 221b of the emitter 221 is not completely folded and a slight curvature is formed, portions further away from each other in the electron emission direction x may be formed at both sides of the emitter 221 based on the front end 221a. In this case, it may be understood that the front side portion 221b is formed in a blunt shape, and a threshold value which is a voltage value at which electrons start to be emitted, and a max current value which is a maximum current value may be increased. Alternatively, when the emitter 221 is completely folded, the both sides thereof may be formed in parallel with each other based on the folded portion. In this case, it may be understood that the front side portion 221b of the emitter 221 is formed in a pointed shape, and the threshold value and the max current value may be decreased. This difference in shape may be selected according to the required field emission characteristic.

Referring to FIGS. 12 and 13, the field emission assembly 220 may include the holder 222. The holder 222 of the field emission assembly 220 according to another embodiment of the present disclosure may have a pipe shape extending in the electron emission direction x. However, the present disclosure is not limited thereto, and when a structure or part for fixing the emitter 221 to the holder 222 may be provided, the shape of the holder 222 may not be limited to a pipe shape.

A fixing hole 2223 may be formed in the holder 222. One fixing hole 2223 may be formed. The fixing hole 2223 may be formed at a front end of the holder 222 formed in a pipe shape in the electron emission direction x. The fixing hole 2223 may be an empty space having a cylindrical shape. However, the present disclosure is not limited thereto, and the fixing hole 2223 may be formed in various shapes, such as an oval shape, a semicircular shape, and a polygonal shape in a cross section, as long as the both ends of the emitter 221 may be fixed.

The fixing hole 2223 may fix the emitter 221. Specifically, all the both ends of the emitter 221 may be fixed to one fixing hole 2223. The both ends of the emitter 221 may be fitted and coupled to the fixing hole 2223, or the both ends of the emitter 221 may be placed in the fixing hole 2223 and then fixed to the holder 222 through a physical deformation caused by pressurizing a side surface of the holder 222.

Specifically, when the both ends of the emitter 221 are fitted and coupled to the fixing hole 2223, a diameter of the fixing hole 2223 may be smaller than twice a diameter of the emitter 221. In this case, shapes of the both ends of the emitter 221 may be slightly deformed as the emitter 221 is inserted into the fixing hole 2223. In this process, the emitter 221 may be fixed due to a frictional force between an inner surface of the fixing hole 2223 and the emitter 221.

Meanwhile, when the both ends of the emitter 221 are placed in the fixing hole 2223 and then fixed by pressurizing the side surface of the holder 222, the fixing hole 2223 may be initially formed to have a size that is greater than twice the diameter of the emitter 221. In this case, when the both ends of the emitter 221 are placed inside the fixing hole 2223 and then the side surface of the holder 222 is pressurized to deform the shape of the holder 222, the emitter 221 placed inside the fixing hole 2223 may be pressurized by the inner surface of the fixing hole 2223 and fixed to the holder 222.

Figure 14:
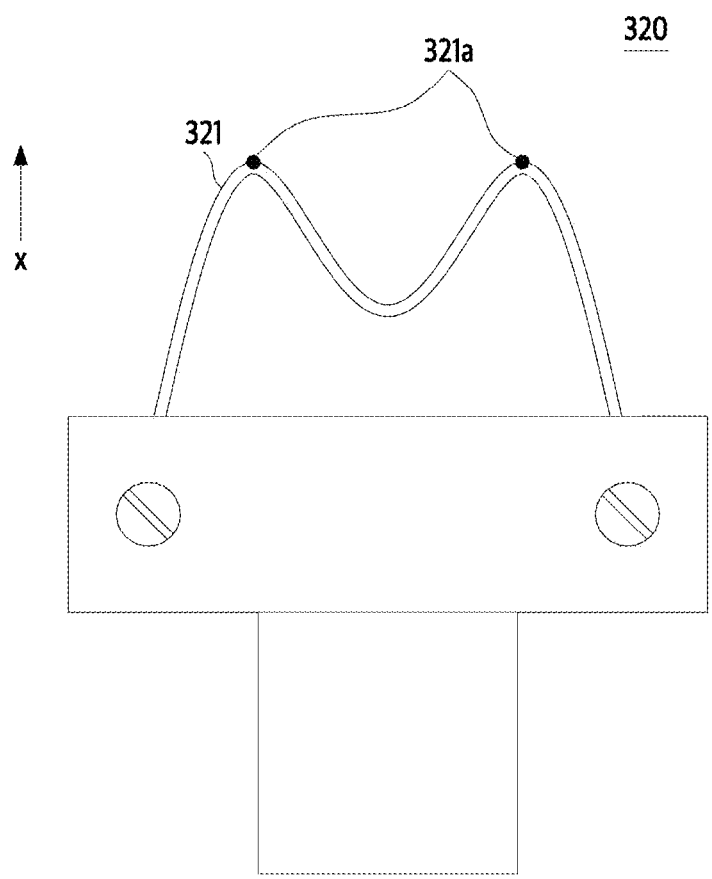
FIGS. 14 and 15 are diagrams illustrating field emission assemblies according to still another example embodiments of the present disclosure.
Figure 15:
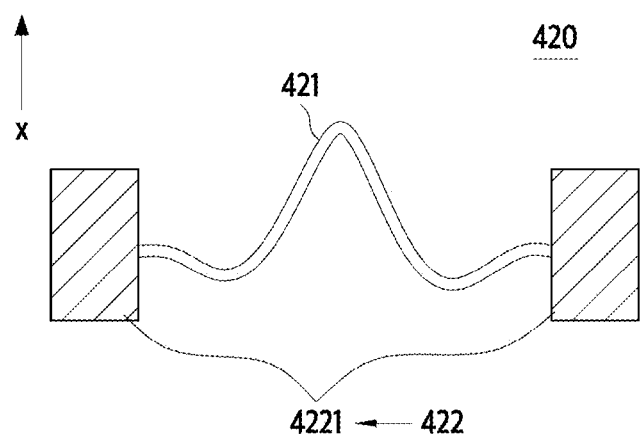

FIGS. 14 and 15 are diagrams illustrating field emission assemblies according to still another example embodiments of the present disclosure.

Detailed configurations of field emission assemblies 320 and 420, which will not be described below, may be the same as the detailed configuration of the field emission assembly 120 according to one embodiment of the present disclosure described with reference to FIGS. 1 to 11.

Referring to FIG. 14, an emitter 321 may include a portion convexly curved or bent in the electron emission direction x. In this case, unlike the field emission assembly 120 according to one embodiment of the present disclosure, the emitter 321 may be formed in a shape having a plurality of peaks (e.g., two peaks as shown in FIG. 14). In this case, portions may be formed in the emitter 321 to be concavely curved or bent in the electron emission direction x.

When the emitter 321 is formed in a shape having a plurality of peaks and an electric field is applied to the emitter 321, each peak may be an electron emission point 321a. That is, the number of electron emission points 321a may correspond to the number of peaks formed in the emitter 321. A field emission characteristic of the electron emission point 321a formed at each peak may be varied according to relative positions of the electron emission points 321a or a difference in curvature between the electron emission points 321a.

The peak forming the electron emission point 321a of the emitter 321 may be formed in various numbers. When the number of the electron emission point 321a is increased, an average value of a threshold, which is the minimum voltage at which electrons may be emitted from the emitter 321, may be increased, whereas a great deal of electromagnetic waves may be generated. On the other hand, when the number of the electron emission point 321a is decreased, the shape of the emitter 321 is simplified and thus the field emission assembly 320 may be consistently manufactured so that uniformity of a field emission characteristic and a lifetime of the electromagnetic wave generator may be improved.

Referring to FIG. 15, fixing parts 4221 of a holder 422 may be provided at both sides of an emitter 421. In this case, both ends of the emitter 421 may be fixed to the fixing parts 4221 provided at the both sides of the emitter 421, respectively.

Through the above structure of the field emission assembly 420, the emitter 421 may be formed in a more free-form manner. For example, the emitter 421 may include a portion protruding rearward than the both ends fixed to the fixing part 4221 in the electron emission direction x.

The number of peaks formed by curving or bending the emitter 421 may be variously controlled. For example, as shown in FIG. 15, the emitter 421 may include merely one peak shape protruding in the electron emission direction x. However, the present disclosure is not limited thereto, and when a plurality of electron emission points are required, two or more peaks protruding in the electron emission direction x may be formed by fixing a degree of flection of the emitter 421 or an interval between the fixing parts 4221.

Peaks formed in the electron emission direction x by curving or bending the emitter 421 may be formed at various positions. For example, as shown in FIG. 15, the peak may be formed at a position protruding further than the both ends of the emitter 421 in the electron emission direction x. However, the present disclosure is not limited thereto, and when it is necessary to further retreat a point at which electrons are emitted, the peak may be formed further rearward than the both ends of the emitter 421 in the electron emission direction x. For example, it can be understood that the emitter 421 has a shape in which the shape of the emitter 321 shown in FIG. 14 is reversed.

In accordance with the present disclosure, it is possible to improve the uniformity of a field emission characteristic in an emitter and a lifetime of the electromagnetic wave generator.

In addition, due to the uniformity of the field emission characteristic, controlling of a generation amount or an intensity of electromagnetic waves may be more precisely performed.

Any or other example embodiments of the present disclosure described above are not mutually exclusive or distinct. Any of the above-described example embodiments or other example embodiments of the present disclosure may be mixed or combined in each configuration or each function.

For example, it means that a configuration A described in a specific embodiment and/or drawings may be combined with a configuration B described in other embodiments and/or drawings. That is, even when a coupling between components is not directly described, it means that the coupling is possible except for a case in which it is described that the coupling is impossible.

The above detailed description need not be construed as restrictive in all respects and needs to be considered as illustrative. The scope of the present disclosure needs to be determined by a reasonable interpretation of the appended claims, and all modifications within the equivalent scope of the present specification are included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A field emission assembly, comprising:
   a linear emitter which includes carbon nanotube (CNT) fibers and emits electrons, the emitter having both ends; and
   a holder configured to fix the emitter,
   wherein both ends of the emitter are fixed to the holder, and the emitter includes at least one of a curved portion that causes to form a peak in an electron emission direction and a bent portion that causes to form a peak in the electron emission direction.

2. The field emission assembly of claim 1, wherein the emitter is convexly curved to form the peak in the electron emission direction or is bent to form the peak in the electron emission direction.

3. The field emission assembly of claim 2, wherein, based on a front end of the emitter in the electron emission direction, the both sides of the emitter are close to each other in the electron emission direction or some regions are in parallel with each other when the both sides of the emitter are close to each other in the electron emission direction.

4. The field emission assembly of claim 1, wherein the emitter has a shape in which a slope of a tangent line is continuously varied.

5. The field emission assembly of claim 4, wherein:
   the emitter is convexly curved in the electron emission direction; and
   a curvature radius of a front end of the emitter in the electron emission direction is formed smaller than those of other portions of the emitter.

6. The field emission assembly of claim 1, wherein the emitter is formed of a primary twisted yarn formed by twisting a plurality of CNT fibers.

7. The field emission assembly of claim 1, wherein:
   the emitter is formed of a secondary twisted yarn;
   the secondary twisted yarn is formed by twisting a plurality of primary twisted yarns; and
   the primary twisted yarn is formed by twisting a plurality of CNT fibers.

8. The field emission assembly of claim 1, wherein the emitter is formed of a braided yarn.

9. The field emission assembly of claim 8, wherein the braided yarn is formed by braiding a plurality of CNT fibers.

10. The field emission assembly of claim 8, wherein:
    the braided yarn is formed by braiding a plurality of primary twisted yarns; and
    the primary twisted yarn is formed by twisting a plurality of CNT fibers.

11. The field emission assembly of claim 8, wherein:
    the braided yarn is formed by braiding a plurality of secondary twisted yarns;
    the secondary twisted yarn is formed by twisting a plurality of primary twisted yarns; and
    the primary twisted yarn is formed by twisting a plurality of CNT fibers.

12. The field emission assembly of claim 1, wherein the both ends of the emitter are spaced apart from each other and fixed to the holder.

13. The field emission assembly of claim 12, wherein:
    two fixing holes capable of fixing the emitter are formed in the holder; and
    the both ends of the emitter are fixed to the two fixing holes, respectively.

14. The field emission assembly of claim 1, wherein the both ends of the emitter are adjacent to each other and fixed to the holder.

15. The field emission assembly of claim 14, wherein:
    one fixing hole capable of fixing the emitter is formed in the holder; and
    all the both ends of the emitter are fixed to the holder.

16. The field emission assembly of claim 15, wherein:
    the holder is formed in a pipe shape extending in the electron emission direction; and
    the fixing hole is formed at a front end of the holder in the electron emission direction.

17. The field emission assembly of claim 1, wherein:
    the holder includes two members divided based on a plane passing through points where the both ends of the emitter are fixed, and a coupling member configured to couple the two members; and
    the both ends of the emitter are disposed between the two members, are pressurized by the two members by tightening the coupling member and are fixed to the holder.

18. An electromagnetic wave generator, comprising:
    a field emission assembly including:
      a linear emitter which has carbon nanotube (CNT) fibers and emits electrons, the emitter having both ends; and
      a holder configured to fix the emitter; and
    an anode in which electrons emitted from the field emission assembly collide to generate electromagnetic waves,
    wherein both ends of the emitter are fixed to the holder, and the emitter includes at least one of a curved portion that causes to form a peak toward the anode and a bent portion that causes to form a peak toward the anode.

19. The electromagnetic wave generator of claim 18, wherein the holder is disposed at a side opposite to the anode based on the emitter.

20. The electromagnetic wave generator of claim 18, wherein, based on the front end of the emitter in the electron emission direction, both sides of the emitter are close to each other toward the anode or some regions are in parallel with each other when the both sides of the emitter are close to each other toward the anode.

* * * * *